United States Patent [19]

Allen

[11] Patent Number: 4,871,524

[45] Date of Patent: Oct. 3, 1989

[54] HYDROGEN PURIFICATION PROCESS

[75] Inventor: Robert H. Allen, Baton Rouge, La.

[73] Assignee: Ethyl Corporation, Richmond, Va.

[21] Appl. No.: 92,638

[22] Filed: Sep. 3, 1987

[51] Int. Cl.$^4$ .......................... C01B 33/02; B05D 7/00
[52] U.S. Cl. ........................................ 423/349; 55/68;
55/73; 55/74; 62/18; 423/350; 423/648.1;
427/213
[58] Field of Search ................... 423/648 R, 349, 350,
423/648.1; 62/18; 427/213

[56] References Cited

U.S. PATENT DOCUMENTS

| | | | |
|---|---|---|---|
| 2,634,286 | 4/1953 | Elliott et al. | 423/648 R |
| 2,671,722 | 3/1954 | Sweetser et al. | 423/648 R |
| 3,012,861 | 12/1961 | Ling | 423/349 |
| 3,041,141 | 6/1962 | Shoemaker | 23/204 |
| 3,126,264 | 3/1964 | Damsz | 62/18 |
| 3,130,013 | 4/1964 | Wilson et al. | 423/349 |
| 3,377,138 | 4/1968 | Gutmann et al. | 423/651 |
| 3,628,340 | 12/1971 | Meisler et al. | 62/18 |
| 3,839,847 | 10/1974 | Banikiotes et al. | 55/58 |
| 3,864,465 | 2/1975 | Hoffert | 423/648 R |
| 3,963,838 | 6/1976 | Setty et al. | 423/350 |
| 3,992,167 | 11/1976 | Beddome | 62/18 |
| 4,043,770 | 8/1977 | Jakob | 55/62 |
| 4,154,870 | 5/1979 | Wakefield | 423/350 |
| 4,242,875 | 6/1981 | Schaefer | 62/63 |
| 4,292,344 | 9/1981 | McHale | 427/45.1 |
| 4,444,811 | 4/1984 | Hsu et al. | 423/349 |
| 4,684,513 | 8/1987 | Iya | 427/213 |
| 4,751,067 | 6/1988 | Levin | 423/350 |
| 4,784,840 | 11/1988 | Gautreaux et al. | 427/213 |

FOREIGN PATENT DOCUMENTS

| | | | |
|---|---|---|---|
| 235746 | 10/1959 | Australia | 423/349 |
| 644300 | 7/1962 | Canada | 423/350 |
| 1283407 | 2/1961 | France | 423/349 |
| 1488 | 1/1974 | Japan | 423/648 R |
| 185426 | 10/1983 | Japan | 423/350 |
| 45916 | 3/1984 | Japan | 423/350 |
| 77116 | 5/1985 | Japan | 423/350 |
| 77117 | 5/1985 | Japan | 423/350 |
| 831216 | 3/1960 | United Kingdom | 423/349 |
| 851962 | 10/1960 | United Kingdom | |
| 932427 | 7/1963 | United Kingdom | 423/350 |
| 2028289 | 2/1980 | United Kingdom | 423/342 |

OTHER PUBLICATIONS

European Patent Application No. 0073637, published Mar., 1983.
European Patent Application No. 0181803, published May, 1986.
Eversteijn, *Philips Res. Repts.*, 26, 134–144, (1971).
Hsu et al., *J. Electrochem Soc.: Solid State Science and Technology*, vol. 131, No. 3, pp. 660–663, (Mar., 1984).
Hsu et al., *Eighteenth IEEE Photovoltaic Specialists Conference*, (1984), pp. 553–557.

*Primary Examiner*—John Doll
*Assistant Examiner*—Wayne A. Langel
*Attorney, Agent, or Firm*—P. M. Pippenger; J. F. Sieberth

[57] ABSTRACT

Hydrogen-containing effluent gas can be treated with activated carbon to remove boron or phosphorus impurity prior to recycle to a fluidized bed reactor. The process is conducted at cryogenic temperatures.

11 Claims, No Drawings

HYDROGEN PURIFICATION PROCESS

FIELD OF THE INVENTION

This invention relates to the purification of hydrogen. In particular, it relates to the removal of boron and phosphorus from hydrogen.

BACKGROUND OF THE INVENTION

It is well known that hydrogen can be purified using cryogenic purification methods; see U.S. Pat. Nos. 3,628,340, 3,839,847, 4,043,770 and 4,242,875 as illustrative art. Activated carbon is a widely used adsorbent for purifying various substances.

It is known in the art that undesirable levels of boron and/or phosphorus can render silicon unsuitable for semiconductor use. It is also known in the art that silane in hydrogen can be thermally decomposed to produce silicon. It is also known that traces of boron and phosphorus should be removed from silane prior to converting it to electronic grade silicon.

U.S. Pat. No. 3,041,141 discloses use of amines to reduce boron levels in silane.

British No. 851,962 discloses use of alkaline earth metal hydrides to reduce boron levels in silane.

It is believed that the ability of activated carbon to remove boron and phosphorus from hydrogen has not been previously described.

SUMMARY OF THE INVENTION

It has been discovered that activated carbon reduces the levels of phosphorus- and/or boron-containing material in hydrogen, and that this method can be used in conjunction with a process for preparing polysilicon from silane.

DESCRIPTION OF PREFERRED EMBODIMENTS

This invention relates to a process for the purification of hydrogen. It also relates to a method of improving the quality of polysilicon made by thermal decomposition of silane. The method comprises treating hydrogen with activated carbon to remove boron- and phosphorus-containing impurity. Although not bound by any theory, it is believed the method of this invention removes boron hydrides such as $BH_3$ and $B_2H_6$ and phosphorus hydrides such as $PH_3$ from the hydrogen.

The method can be conducted by passing hydrogen through a bed of activated carbon to adsorb boron and phosphorus.

Low temperatures are used for conducting the process of this invention. Thus, process temperatures much below ambient, say about $-150°$ to about $-280°$ F. ($-101°$ to about $-173°$ C.) are preferred. Such temperatures are referred to herein as "cryogenic temperatures". Generally speaking, the lower the temperature, the lower the level of phosphorus and boron levels achieved.

The process pressure is not critical. Atmospheric, subatmospheric and superatmospheric pressures can be used. Thus, atmospheric and slightly elevated pressures, e.g. 1 to 50 psig or higher can be employed. At a given temperature, the partial pressure of a component being adsorbed, in equilibrium with the adsorbed phase, is fixed. Therefore, the higher the total pressure, the lower the concentration of the component in the gas phase. Consequently higher pressures within the above-cited range, and even higher pressures are beneficial.

As mentioned above, the process of this invention relates to an improved method for the formation of polysilicon. In a preferred embodiment of this invention, polysilicon is produced in a fluidized bed process which comprises the decomposition of silane to polysilicon.

As well known in the art, silane decomposes by two competing mechanisms. The first of these is heterogeneous deposition, by which polysilicon product is produced. The second is homogeneous decomposition, which produces unwanted silicon dust or fines. In general, both mechanisms simultaneously occur. Hence, in a fluidized bed process polysilicon is produced by deposition on a bed of seed silicon particles, and there is also some formation of undesirable silicon dust or fines. Such fines or dust can be entrained with effluent gas from the reactor.

As well known, hydrogen can be used as a carrier gas in silicon processes based on thermal decomposition of silane. For example, the concentration of silane in the deposition gas can be 1–20 mole percent; the remainder being hydrogen.

A fluidized bed process for producing polysilicon from silane is a net producer of hydrogen. When silane decomposes, two molecules of hydrogen are produced for each atom of silicon. It is desirable to recycle the hydrogen produced for use as a carrier gas, since recycle enhances process economics.

When the process of this invention is utilized in conjunction with a silane decomposition process for the preparation of polysilicon, the effluent gases from the fluidized bed reactor are first treated to remove the silicon dust or fines. In general, the silicon dust or fines particles vary in size from submicron material to particles having a diameter up to about 10 microns. These particles can be removed from the hydrogen-containing effluent gas by methods known in the art for removing solid particles of this size range from a stream of gas.

After removal of the fines or dust, the gas is cooled to a temperature within the range discussed above. After being so cooled, the gas is contacted with activated carbon. As well known, activated carbon is a microcrystalline, non-graphitic form of carbon characterized by a large surface area, e.g. 300–2500 m$^2$/g. Typical surface areas for activated carbon used with this invention are 1000–2000 m$^2$/g. Such carbons have pores of 3 nm or less. They can be compacted into granules or pellets for use in this invention.

Adequate activated carbon to remove the desired amount of silane is employed in this invention. The activated carbon can be within a multiplicity of containers within the adsorption zone. More specifically, it is not necessary to keep the activated carbon in one vessel. It can be in a plurality of vessels, e.g. 3 or 5, or more, arranged in sequence, each vessel having gas inlet and outlet means. Alternatively containers of activated carbon can be arranged in parallel with one, two or more vessels in each parallel train. When a parallel arrangement is used, a suitable manifold is employed to distribute the flow of hydrogen to the adsorption vessels that are arranged in parallel.

When a manifold is used to distribute hydrogen alternatively down less than all parallel paths, this facilitates continuous operation. One path can be used while the other is being reconditioned. After it is reconditioned, it can be used to adsorb boron- and/or phosphorus-containing components, while maintenance is performed on the other parallel system.

Reconditioning can involve renewal of activated carbon which has adsorbed enough boron and/or phosphorus components to lower its ability to adsorb additional boron- or phosphorus-containing components at a desired rate.

Regeneration can be conducted by purging the activated carbon at elevated temperature using hydrogen as the purge gas. The regeneration can be conducted at temperatures of from about 175° C. or higher. Preferably a temperature within the range of 175°–200 C. is used; more preferably 175°–185 C. The purge can be conducted using a flow opposite to the direction of flow used for adsorption.

After contact with the activated carbon adsorbent, the hydrogen with diminished P or B levels can be warmed or heated to a temperature higher than the cryogenic temperature(s) used in the process.

To conserve energy, the warming can be conducted using a heat exchanger, so that heat removed from the incoming hydrogen stream is used to warm the purified hydrogen downstream from the adsorption zone.

It has been found that use of this invention in conjunction with a silane decomposition method for producing polysilicon in a fluidized bed affords a polysilicon product with a desirable, low range of boron and phosphorus. In contrast, it was found that if the process of this invention was not utilized in conjunction with the fluidized bed method, polysilicon product could have an undesirable high level of boron and/or phosphorus.

For example, with an 8″ diameter fluidized bed reactor, a deposition gas containing about 11.1 mole percent silane in hydrogen was used. The hydrogen feed rate was about 9 SCFM, and the silane feed rate was about 1.12 SCFM, i.e. 5.7 pounds per hour. The silicon product was produced at the rate of about 2 kg/hr.

Before an adsorber containing 100 pounds of activated carbon was introduced into the system to purify the hydrogen-containing off gases prior to recycle to the fluidized bed, the following impurity level ranges in the polysilicon product were noted over a series of runs:

| Phosphorus (P) | 1.5–2.3 ppba |
| Boron (B) | 0.3–0.8 ppba |
| Carbon (C) | 0.5 typical ppma |

After the use of the adsorber (at a temperature about −170° C.) the following purity level ranges were found over a series of runs:

| Phosphorus | 0.2–0.3 ppba |
| Boron | 0.15–0.45 ppba |
| Carbon | 0.5 typical ppma |

The results indicate that there was little or no change in the carbon level. The other contaminant levels were reduced, with the most significant change being in the reduction in the amount of phosphorus.

The 100 pound activated carbon adsorber was operated with a flow of 10–12 SCFM of hydrogen containing 100–500 ppm silane, with no breakthrough after 300 hours of operation.

With an 18″ diameter fluidized bed reactor, adsorption means comprising two adsorber vessels in series, containing 800 pounds of activated carbon each, were employed. Typically, 125–140 SCFM of hydrogen containing 0.5–1.0 mole percent of silane, was fed to the adsorber vessels. Thus, for example (a) 68 SCFM $H_2$ was added to the reactor for levitation to the bed,
(b) 50 SCFM $H_2$ was added to the reactor freeboard—the space above the fluidized bed to cool the gas and apparatus temperature there,
(c) ~20 SCFM $H_2$ resultant from silane decomposition in the reactor to produce silicon
(d) ~138 SCFM total $H_2$ to adsorber vessels.

The absorber vessels were operated at about −170° C., and were regenerated by heating (as described above) after about 60 hours, based on silane breakthrough.

To the fluidized bed was added about 9.8 SCFM of silane and about 68 SCFM of hydrogen (12.5 mole % silane). The yield of silicon deposited was about 16 kg per hour (76% yield).

Analysis of a product samples indicated the following contaminant levels.

| Boron: | 0.15 ± 0.07 ppba |
| Phosphorus: | 0.18 ± 0.07 ppba |
| Carbon: | 0.2–0.3 ppma |

Results without the adsorber vessels were not obtained, since the concept of adsorber use was demonstrated with the 8″ diameter reactor.

Hydrogen to the adsorbers contained ppm levels of methane; the methane appeared to be completely removed by the adsorbers.

The process of this invention can be utilized in any process where it is desirable to reduce the amount of boron and/or phosphorus in hydrogen. The boron and phosphorus impurity removed need not arise from chemicals utilized as raw materials; for example, the boron and phosphorus can arise from the materials of construction or equipment utilized in a plant. Thus, the process of this invention can be used in conjunction with fluidized bed and non-fluidized bed processes for the production of polysilicon from silane, where hydrogen is recycled, and the process equipment contributes undesirable boron and/or phosphorus content to the hydrogen gas.

In light of the above description of this invention and how it can be used, a skilled practitioner can make modifications and variations of the process conditions and variables employed without departing from the spirit or scope of the following appended claims.

What is claimed is:

1. In a process for producing polysilicon in a fluidized bed reactor wherein silane is decomposed on a bed of seed silicon particles fluidized by hydrogen gas and the hydrogen gas from the fluidized bed reactor is recycled to fluidize said bed of seed silicon particles, the improvement comprising contacting said hydrogen gas with activated carbon at cryogenic temperature so as to remove boron and/or phosphorus-containing contaminant from said hydrogen gas prior to recycling said hydrogen gas to said fluidized bed reactor.

2. The process of claim 1 wherein said cryogenic temperature ranges from about −150° F. to about −280° F.

3. The process of claim 1 which includes treating said hydrogen gas to remove silicon dust or fine particles prior to contacting said hydrogen gas with said activated carbon.

4. The process of claim 1 wherein said activated carbon has been a surface area of 300–2,500 m$^2$/g.

5. The process of claim 1 wherein said activated carbon is in one vessel.

6. The process of claim 1 wherein said activated carbon is in a multiplicity of containers.

7. The process of claim 6 wherein said containers are arranged in parallel.

8. The process of claim 6 wherein said containers are arranged in sequence.

9. The process of claim 1 which includes regenerating said activated carbon after its ability to absorb additional boron and/or phosphorus-containing contaminant is reduced.

10. The process of claim 9 wherein regenerating said activated carbon comprises purging said activated carbon at a temperature of from 175°–200° C. with hydrogen as a purge gas.

11. The process of claim 1 which includes heating said hydrogen gas, subsequent to contact with said activated carbon, to a temperature higher than said cyrogenic temperature.

* * * * *